United States Patent
Huang et al.

(10) Patent No.: US 10,367,829 B2
(45) Date of Patent: *Jul. 30, 2019

(54) PROTECTING THREAT INDICATORS FROM THIRD PARTY ABUSE

(71) Applicant: Threat Stream, Inc., Redwood City, CA (US)

(72) Inventors: Wei Huang, Los Altos Hills, CA (US); Yizheng Zhou, Cupertino, CA (US); Hugh Njemanze, Redwood City, CA (US)

(73) Assignee: Anomali Incorporated, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/946,088

(22) Filed: Nov. 19, 2015

(65) Prior Publication Data

US 2017/0149802 A1    May 25, 2017

(51) Int. Cl.
*H04L 29/06* (2006.01)
*G06F 21/55* (2013.01)
*G06F 21/57* (2013.01)

(52) U.S. Cl.
CPC ........ *H04L 63/1416* (2013.01); *G06F 21/554* (2013.01); *G06F 21/577* (2013.01); *H04L 63/06* (2013.01); *H04L 63/1433* (2013.01); *G06F 2221/2101* (2013.01); *G06F 2221/2115* (2013.01); *H04L 63/0435* (2013.01)

(58) Field of Classification Search
CPC ............................ H04L 63/1416; H04L 63/04
USPC .................................................... 726/23
See application file for complete search history.

(56) References Cited

U.S. PATENT DOCUMENTS

| | | | | |
|---|---|---|---|---|
| 8,332,947 B1 * | 12/2012 | Bregman | ............... | G06F 21/577 726/25 |
| 8,631,330 B1 * | 1/2014 | Hwang | ................ | G06F 3/0484 715/707 |
| 9,596,266 B1 * | 3/2017 | Coleman | ............. | H04L 63/1491 |
| 2009/0328209 A1 * | 12/2009 | Nachenberg | ........... | G06Q 10/10 726/22 |
| 2013/0318347 A1 * | 11/2013 | Moffat | .................... | H04L 63/08 713/168 |
| 2014/0373162 A1 * | 12/2014 | Mahaffey | .............. | G06F 21/577 726/25 |
| 2015/0372976 A1 * | 12/2015 | Lonas | ................. | H04L 63/0227 726/11 |
| 2015/0373040 A1 * | 12/2015 | Sander | ................ | H04L 63/1425 726/22 |
| 2017/0109795 A1 * | 4/2017 | Wilson | ............... | G06Q 30/0269 |
| 2017/0126712 A1 * | 5/2017 | Crabtree | ............. | H04L 63/1416 |

* cited by examiner

*Primary Examiner* — Khalil Naghdali
(74) *Attorney, Agent, or Firm* — Fenwick & West LLP

(57) ABSTRACT

A threat analytics system expends significant resources to acquire, structure, and filter the threat indicators provided to the client-side monitoring systems. To protect the threat indicators from misuse, the threat analytics system only provides enough information about the threat indicators to the client-side systems to allow the client-side systems to detect past and ongoing threats. Specifically, the threat analytics system provides obfuscated threat indicators to the client-side monitoring systems. The obfuscated threat indicators enable the client-side systems to detect threats while protecting the threat indicators from misuse or malicious actors.

16 Claims, 5 Drawing Sheets

PROTECTING THREAT INDICATORS FROM THIRD PARTY ABUSE

BACKGROUND

Field of Art

The disclosure generally relates to the field of threat intelligence platforms.

Description of Art

Cyber-threat detection is an integral part of the security infrastructure of an online system. A key part of a typical threat detection system is threat intelligence feeds—feeds that indicate entities that are associated with suspicious behaviors. Information from the threat intelligence feeds is then compared against event information collected from the online system to determine whether any of the events may be associated with cyber-threats.

Threat intelligence feeds are often evaluated and pruned to identify threats that are legitimate and/or time-sensitive. Consequently, a threat collection system may invest significant resources to filter such intelligence feeds according to one or more quality metrics prior to sending such intelligence feeds to an online system for the purposes of threat detection. In some situations, the intelligence feeds may belong to a third party whose investment needs to be protected. Oftentimes, malicious actors and/or competitors gain access to the filtered intelligence feed without requisite permission to utilize the filtered intelligence feeds. Such misuse of the filtered intelligence feeds is undesirable.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
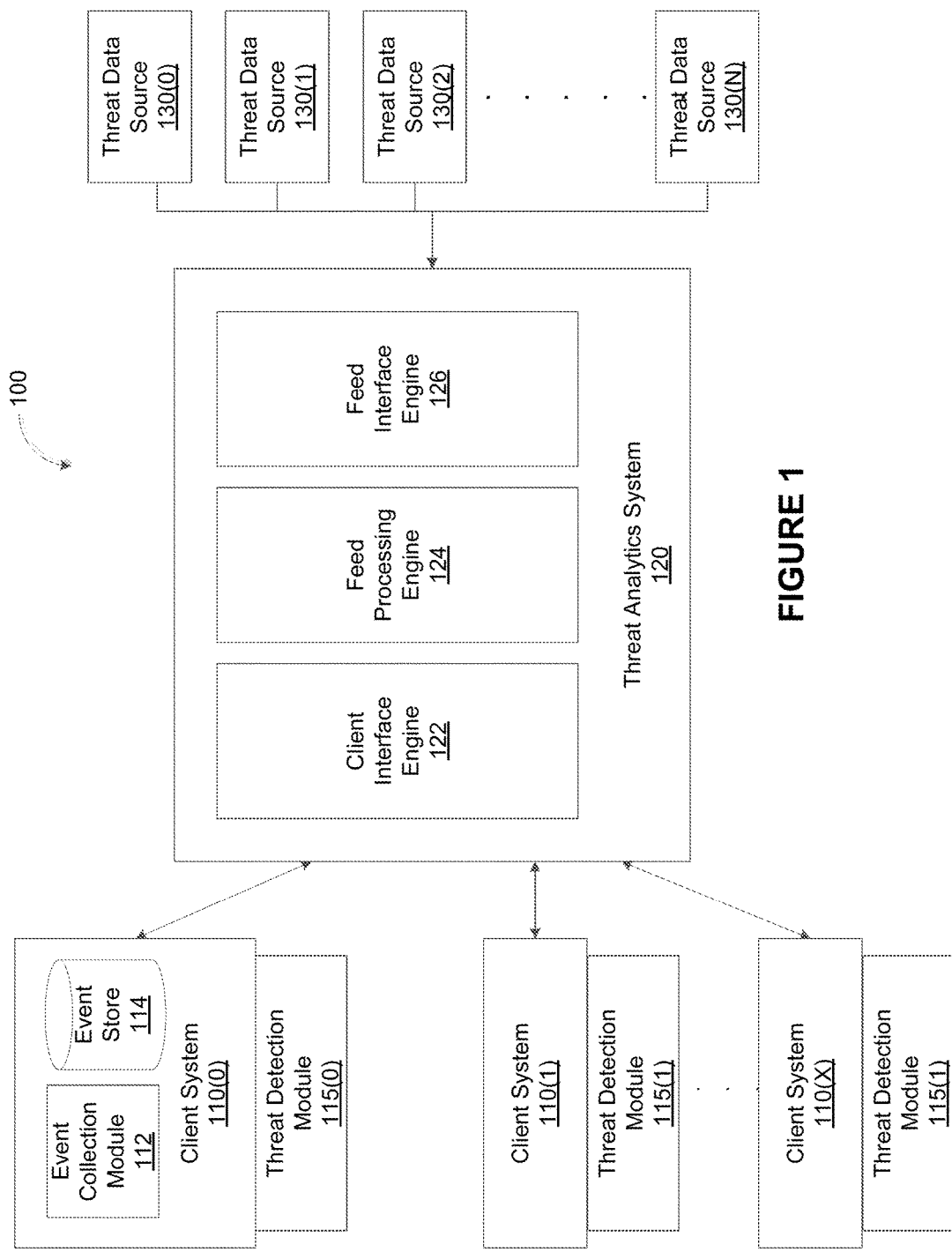
FIG. 1 illustrates a computing environment configured for threat detection.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is a threat analytics system that intelligently processes event information received from downstream client systems to identify red flag events, i.e., events that are indicative of a cyber-threat. In operation, a threat analytics system receives threat indicators from intelligence feed data sources. These threat indicators include entity identifiers, such as IP addresses, domain names, and uniform resource locators (URLs), email, file hash, that have been identified by the intelligence feed data sources as potential threats. The threat analytics system evaluates the respective quality of each of the threat indicators to determine, among other things, whether the threats are legitimate and relevant. The threat analytics system provides threat indicators that are deemed to be of high quality and relevant to client-side security monitoring systems. The client-side monitoring systems, in turn, compare the received threat indicators with locally captured events to determine whether a security breach has occurred at the client-side.

In operation, the threat analytics system expends significant resources to aggregate, process, analyze, and filter the threat indicators provided to the client-side monitoring systems. Therefore, to protect the threat indicators from misuse, the threat analytics system only provides enough information about the threat indicators to the client-side systems to allow the client-side systems to detect past and ongoing threats. Specifically, the threat analytics system provides obfuscated threat indicators to the client-side monitoring systems. The obfuscated threat indicators enable the client-side systems to detect threats but not have free access to all information associated with the threat indicators that is collected by the threat analytics system. In such a manner, the threat analytics system is able to protect the threat indicators from misuse, malicious actors, and competitors. Further, via obfuscated threat indicators, the threat analytics system also protects the source of the threat indicators as well as the investment by potential third parties who may have also invested resources in acquiring the threat indicators.

Example Computing Environment Architecture

FIG. 1 illustrates a computing environment 100 configured for threat detection according to an embodiment. As shown, the computing environment 100 includes security monitoring systems 110(0)-110(N) (collectively, security monitoring systems 110, and, individually, security monitoring system 110), a threat analytics system 120, and threat data sources 130(0)-130(N) (collectively, threat data sources 130, and, individually, threat data source 130). Each of the security monitoring systems 110(0)-110(N) is coupled to one of the threat detection modules 115(0)-115(N) (collectively, threat detection 115, and, individually, threat detection module 115).

A security monitoring system 110 includes an event collection module 112 and an event store 114. In one embodiment, the security monitoring system 110 may be a security information and event management (SIEM) system, log management system, and a security endpoint system. The event collection module 112 connects to various services within the computing infrastructure of a client system to continually collect event information from those services. Such services include network devices, security systems, servers, databases, internet-of-things (IoT) devices, and software applications. Each event is associated with at least a timestamp and one or many entity identifiers to which the event can be attributed. An entity identifier may be an IP address, a domain name, a username, a MAC address, an email address, a file hash, or any other technically feasible unique identifier. The attribution of an event to an entity identifier may be an affirmative attribution or an inferred attribution. The event collection module 112 stores collected event information in the event store 114.

The threat detection module 115 coupled to the security monitoring system 110 is a software module provided by the threat analytics system 120 to the security monitoring system 110 for the purposes of threat detection. The threat detection module 115 receives protected threat indicators from the threat analytics system and compares those indicators with events collected by the client system 110. Based on the comparison, the threat detection module 115 may report one or more red flags to the client system 110. The operations of the threat detection module 115 are described in greater detail in conjunction with FIGS. 2-4.

The threat analytics system 120 processes threat data feeds and provides threat indicators derived from those feeds to the threat detection modules 115. The threat analytics system 120 includes a client interface engine 122, a feed processing engine 124, and a feed interface engine 126.

The client interface engine 122 provides a unified bi-directional communication interface that enables the threat analytics system 120 to communicate with the security monitoring systems 110. Importantly, the client interface engine 122 abstracts the various communication protocols across different security monitoring systems 110 such that other downstream components of the threat analytics system 120 operate without specific knowledge of the various protocols. The client interface engine 122 includes a one-to-many push communication feature that enables downstream components of the threat analytics system 120 to transmit a single communication to all the security monitoring systems 110. Further, for incoming communications from a security monitoring system 110, the client interface engine 122 checkpoints the communications such that, if the communication is disrupted for any reason, the security monitoring system 110 is not required to restart the communication from the beginning.

The feed interface engine 126 provides a communication interface that enables the threat analytics system 120 to receive threat data feeds from the threat data sources 130. A threat data feed includes a list of threat indicators that the threat data source 130 from which the feed was received has deemed as a threat. The feed interface engine 126 receives threat data feeds and transmits those feeds to the threat feed processing engine 124 for further processing.

The feed processing engine 124 evaluates threat indicators identified by the various threat data feeds to determine the quality of the threat indicators. In one embodiment, the feed processing engine 124 determines the quality of a threat indicator based on the quality of the threat feed that reported the threat indicator. Specifically, for a given data feed, the feed processing engine 124 determines the number of threat indicators that were deemed to be invalid over time. If more than a threshold number of threat indicators were previously deemed invalid, then the quality of the data feed and the threat indicators included therein is deemed to be lower relative to a data feed having fewer invalid threat indicators.

The feed processing engine 124 periodically selects a subset of the threat indicators having a minimum quality and relevance and provides those to the threat detection modules 115 via the client interface engine 122 for threat detection purposes. In order to protect the intelligence required to evaluate and select the threat indicators, the feed processing engine 124 obfuscates the threat indicators provided to the threat detection modules 115. In one embodiment, the feed processing engine 124 obfuscates the threat indicators using a hashing algorithm, such as an md5 hashing algorithm, a secure hashing algorithm (SHA), and a Bloom filter. In an alternate embodiment, the feed processing engine 124 obfuscates the threat indicators using an encryption algorithm where the key of the encryption algorithm is pre-determined. Alternatively, the key of the encryption algorithm may be derived from one or more fields of the threat indicator, such as the entity identifier. In another alternate embodiment, the feed processing engine 124 obfuscates the threat indicators using a password protection mechanism. The password for the password protection mechanism is independently provided to an operator or an entity associated with the threat detection modules 115.

The threat detection modules 115 are able to detect the existence of threats using the obfuscated threat indicators but do not have access to the raw information associated with the threat indicators. In such a manner, the threat analytics system 120 is able to protect the threat indicators from misuse or malicious actors. Further, via obfuscated threat indicators, the threat analytics system also protects the source of the threat indicators as well as the investment by potential third parties who may have also invested resources in acquiring the threat indicators.

Protecting Threat Indicators

Figure 2:
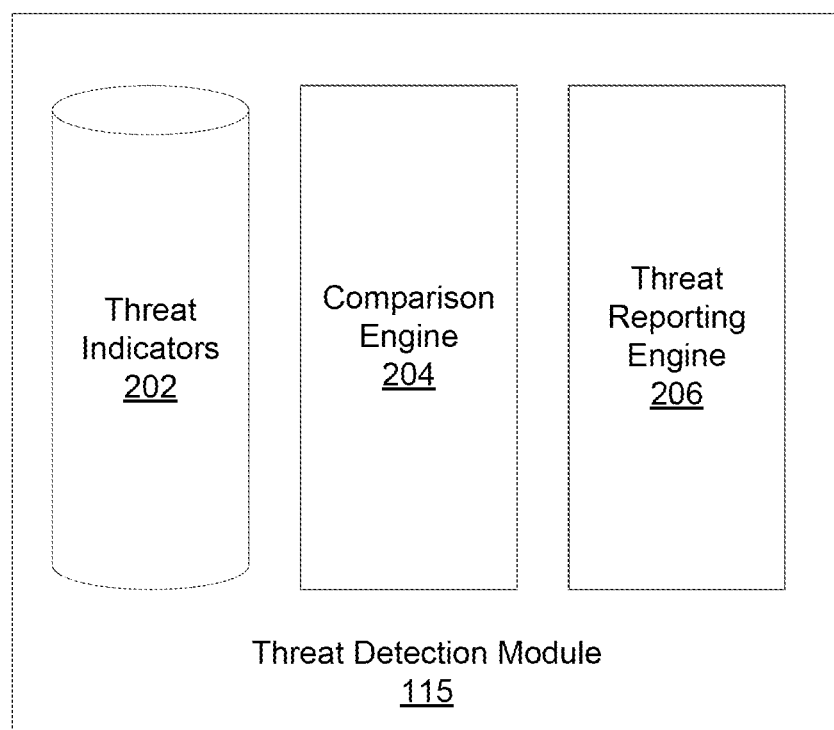
FIG. 2 illustrates a detailed diagram of the threat detection module in FIG. 1.

FIG. 2 illustrates a detailed diagram of the threat detection module 115 in FIG. 1. As shown, the threat detection module 115 includes a threat indicators store 202, a comparison engine 204, and a threat reporting engine 206.

The threat indicators store 202 stores obfuscated threat indicators received from the feed processing engine 124. As discussed above, the feed processing engine 124 obfuscates the threat indicators to protect the threat indicators from misuse or malicious actors. The threat indicators may be obfuscated via a password mechanism, a hashing algorithm, or an encryption algorithm. The threat indicators store 202 stores each obfuscated threat indicator in conjunction with a timestamp indicating when the indicator was received from the feed processing engine 124.

The comparison engine 204 evaluates event data stored in the event store 114 to determine whether the client system 110 has been exposed to any security threats. Specifically, the comparison engine 204 compares the entity identifier of each event stored in the event store 114 with each of the threat indicators stored in the store 202. In one embodiment, the comparison engine 204 aggregates event data stored in the event store 202 in an aggregated data structure. This enables the comparison engine 204 to perform comparison operations between the event data and the obfuscated threat indicators in a more efficient manner.

In the case where the threat indicators are obfuscated via a hashing algorithm or an encryption algorithm, the comparison engine 204 first obfuscates the entity identifier associated with a given event using the same obfuscation mechanism used by the feed processing engine 124. The comparison engine 204 then compares the obfuscated threat indicator with the obfuscated entity identifier associated with the event. If the obfuscated entity identifier matches at least one obfuscated threat indicator stored in the store 202, then the event is categorized as a red flag event warranting further investigation. Conversely, if the obfuscated entity identifier does not match any of the threat indicators, then the event is not indicative of a security threat.

In the case where the threat indicators are obfuscated via a password mechanism, the comparison engine 204 prompts a user or an entity associated with the threat detection module 115 to provide the password for the protected threat indicators. If the correct password is provided, then the comparison engine 204 is able to unlock the threat indicators. The comparison engine 204 then compares the entity identifiers of the various threat indicators with the entity identifiers of each event in the event store 202 to identify any event indicative of a security threat.

Alongside real-time (or close to real-time) threat detection, the comparison engine 204 may also perform a historical analysis on the event data. For example, if an indicator that was not previously identified as a threat is now identified as a threat, then comparison engine 204 may evaluate historical events in the event store to determine whether the security monitoring system 110 experienced the threat.

When the comparison engine 204 identifies a red flag event, the comparison engine 204 sends a notification regarding the red flag event to the threat reporting engine 206. The threat reporting engine 206 reports the existence of the red flag event to the requisite security monitoring system 110 that collected the event information. The threat reporting engine 206 supports various types of reporting mechanisms including individual alerts when a red flag event is identified and time-based (e.g., hourly, weekly, and monthly) reports of all identified red flag events.

In one embodiment, the threat reporting engine 206 provides additional information related to the red flag event that is derived from the obfuscated threat indicator with which the red flag event matched. Because the threat indicator is obfuscated, the threat reporting engine 206 does not have access to such protected information. Therefore, the threat reporting engine 206 de-obfuscates the particular threat indicator with which the red flag event matched. In one embodiment, the threat reporting engine 206 de-obfuscates the threat indicator using a decryption algorithm where the decryption key is the entity identifier. Once decrypted, the threat reporting engine 206 has access to all information associated with the threat indicator and can provide such information to the requisite security monitoring system 110. It is important to note that in such a scenario the decryption key for each of the threat indicators is different depending on the entity identifier. Therefore, it is still significantly difficult to decrypt all of the protected threat indicators even when the single threat indicator is decrypted.

The threat reporting engine 206 also reports red flag events back to the threat analytics system 120. In one embodiment, the threat analytics system 120 may confirm the red flag event as a true positive or a false positive depending on information available to the threat analytics system 120. In another embodiment, the threat analytics system 120 may maintain a relevance index for the security monitoring system 110. When a red flag event is identified using a given threat indicator, the threat analytics system 120 re-computes the relevance index for that type of threat indicator to signify that such threats are relevant to the security monitoring system 110. In one embodiment, the threat analytics system 120 continues to send the obfuscated threat indicators to the threat detection module 115 only when the threat reporting engine 206 reports the red flag events back to the threat analytics system 120. In such a manner, the threat analytics system 120 continues to refine its relevance indices while requiring the threat detection modules 115 to transmit the reports needed for the refining.

Figure 3:
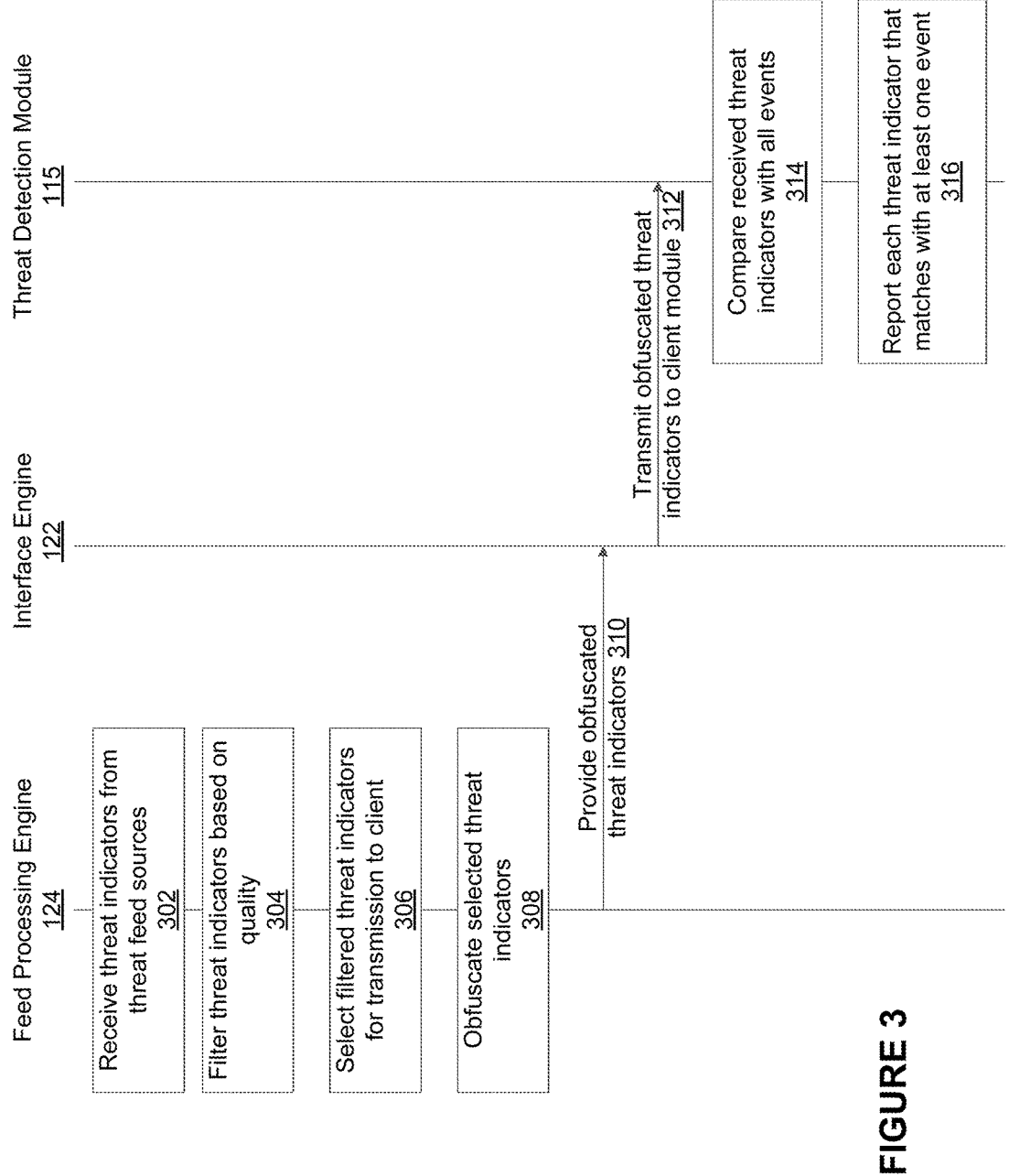
FIG. 3 illustrates an event flow diagram for securely transmitting threat indicators to an unprotected client.

FIG. 3 illustrates an event flow diagram for securely transmitting threat indicators to an unprotected client. Other embodiments may perform the steps of the process illustrated in FIG. 3 in different orders and can include different, additional and/or fewer steps. In alternate embodiments, the steps of the process may be performed by any suitable entities other than the ones depicted.

The feed processing engine 124 receives 302 threat indicators included in threat data feeds provided by threat data sources 130. Again, a threat data feed includes a list of threat indicators that the threat data source 130 from which the feed was received has deemed as a threat. The feed processing engine 124 then filters 304 threat indicators identified by the various threat data feeds based on the relative quality and relevance of the threat indicators. In one embodiment, the feed processing engine 124 determines the quality and relevance of a threat indicator based on the quality of the threat data source that reported the threat indicator.

The feed processing engine 124 selects 306 a subset of the threat indicators having a minimum quality and relevance for transmission to one or more client side systems. In order to protect the intelligence required to evaluate and select the threat indicators, the feed processing engine 124 obfuscates 308 the threat indicators provided to the threat detection modules 115. In one embodiment, the feed processing engine 124 obfuscates the threat indicators using a hashing algorithm such as an md5 hashing algorithm. The feed processing engine 124 then provides 310 the obfuscated threat indicators to the client interface engine 122, which, in turn, transmits 312 the threat indicators to the threat detection modules 115.

In one embodiment, the client interface engine 122 maintains a list of threat indicators that were previously transmitted to each of the threat detection modules 115. For each threat detection module 115, the client interface engine 122, along with transmitting the current threat indicators, may also specify to the threat detection module 115 which of previously stored threat indicators to delete and/or update. In such a manner, the threat indicators stored in each of the threat detection modules 115 are current and up-to-date. Importantly, the same threat indicator may be obfuscated in a different way in a subsequent transmission to a threat detection module 115, and removing older obfuscated threat indicators additionally protects those threat indicators from misuse.

Each threat detection module 115 compares 314 compares the entity identifier of each event collected by the associated client monitoring system with each of the threat indicators stored in the store 202. Importantly, because the threat indicators are obfuscated, the threat detection module 115 first obfuscates the entity identifier associated with a given event using the same obfuscation mechanism used by the feed processing engine 124 at step 308. The threat detection module 115 then compares the obfuscated threat indicator with the obfuscated entity identifier associated with the event. If the obfuscated entity identifier matches at least one obfuscated threat indicator stored in the store 202, then the event is categorized as a red flag event warranting further investigation. When the comparison engine 204 identifies a red flag event, the threat detection module 115 reports 316 the existence of the red flag event to the requisite security monitoring system 110 that collected the event information.

Figure 4:
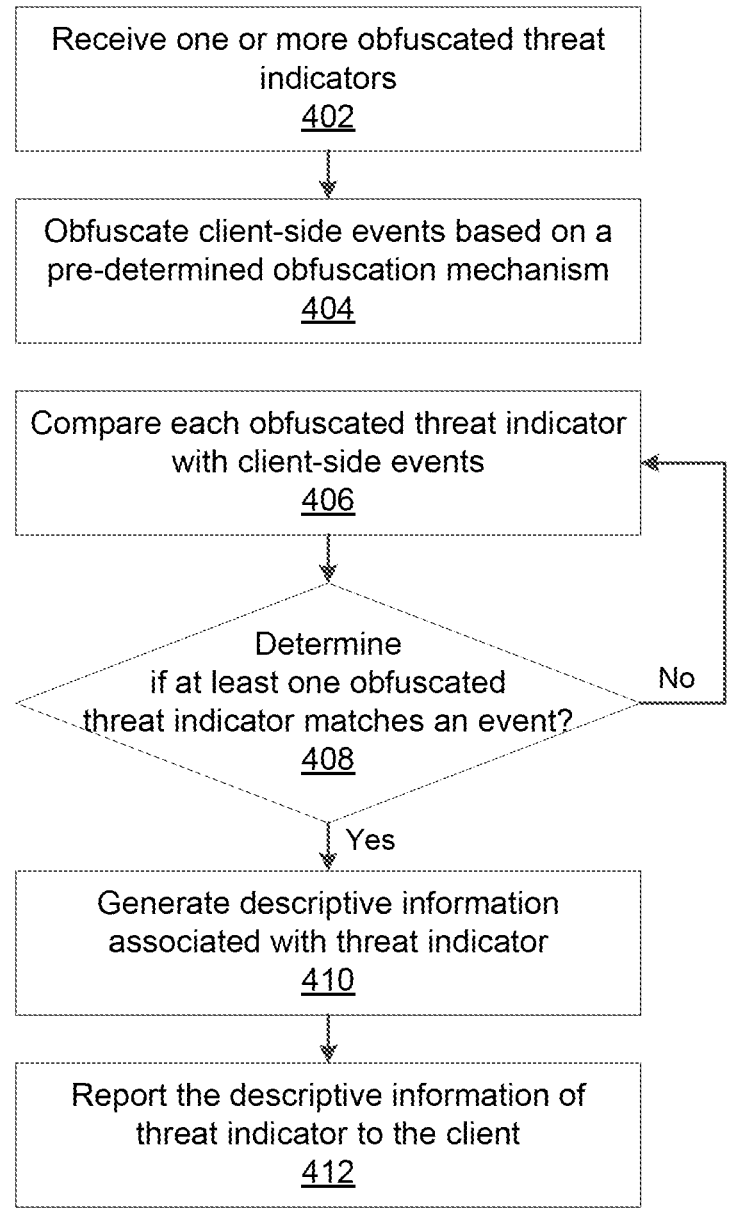
FIG. 4 illustrates an example flow diagram for detecting a threat based on protected threat indicators.

FIG. 4 illustrates an example flow diagram for detecting a threat based on protected threat indicators. Other embodiments may perform the steps of the process illustrated in FIG. 4 in different orders and can include different, additional and/or fewer steps. The process may be performed by any suitable entity, such as the threat detection module 115.

The threat detection module 115 receives 402 one or more obfuscated threat indicators from the feed processing engine 124 via the client interface engine 122. In operation, the threat detection module 115 periodically, e.g., daily or hourly, receives such obfuscated threat indicators. In one embodiment, each threat indicator is associated with an expiration time such that the threat detection module 115 purges the threat indicator when the threat indicator expires.

The threat detection module 115 then obfuscates 404 client-side events collected by the client monitoring system using the same obfuscation mechanism used by the feed processing engine 124 when obfuscating the threat indicators. In particular, each client-side event includes an entity identifier associated with the entity to which the event is attributed. The threat detection module 115 obfuscates the entity identifier included in each event according to the pre-determined obfuscation mechanism.

The threat detection module 115 compares 406 each obfuscated threat indicator with the obfuscated client-side events. The threat detection module 115 then determines 408 whether at least one obfuscated threat indicator matches an obfuscated event. A match indicates that the security monitoring system that collected the event experience a security threat indicated by the threat indicator.

When a threat indicator matches an event, the threat detection module 115 generates 410 descriptive information associated with the threat indicator. Specifically, the threat detection module 115 derives the descriptive information from the obfuscated threat indicator. Because the threat indicator is obfuscated, the threat detection module 115 first de-obfuscates the particular threat indicator with which the event matched. In one embodiment, the threat detection module 115 de-obfuscates the threat indicator using a decryption algorithm where the decryption key is the entity identifier. The threat detection module 115 then reports 412 the existence of the security threat experienced by the security monitoring system 110 as well as the descriptive information of the threat indicator generated at step 410.

Example Computer System

Figure 5:
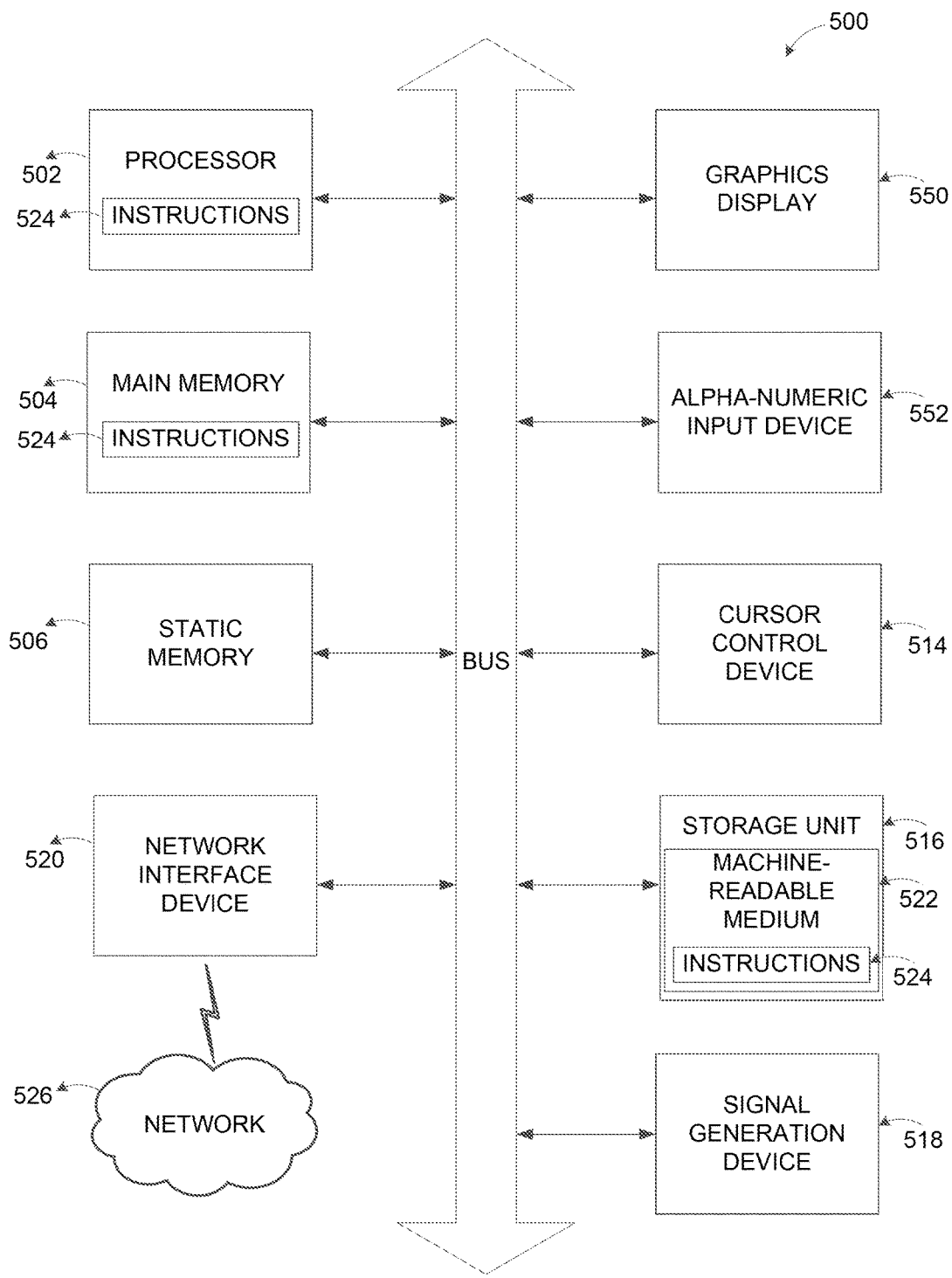
FIG. 5 is a block diagram illustrating components of an example machine configured to read instructions from a machine-readable medium and execute the instructions in a processor (or controller).

FIG. 5 is a block diagram illustrating components of an example machine able to read instructions from a machine-readable medium and execute them in a processor (or controller). Specifically, FIG. 5 shows a diagrammatic representation of a machine in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504 and the storage unit 516 communicate via a bus 508.

In addition, the computer system 500 can include a static memory 506, a display driver 550 (e.g., to drive a plasma display panel (PDP), a liquid crystal display (LCD), or a projector). The computer system 500 may also include alphanumeric input device 552 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 and 2. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Those of skill in the art will appreciate still additional alternative structural and functional designs for a system and a process for threat detection through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:
1. A computer-based method for detecting threats based on obfuscated threat indicators, the method comprising:

receiving, from a server, an obfuscated threat indicator associated with an identified cyber-threat that was determined by the server to be above a threshold level of quality, the obfuscated threat indicator having been generated by the server responsive to determining that the identified-cyber-threat is above the threshold level of quality by: including a threat data source of a threat indicator and excluding raw information of the threat indicator;

identifying one or more client-side events occurring within a third-party system, each client-side event identified by an entity identifier indicating an entity to which the client-side event is attributed;

determining that the third-party system experienced a cyber-threat when the obfuscated threat indicator matches at least one entity identifier; and in response to determining that the third-party system experienced the cyber-threat:
generating descriptive information associated with the obfuscated threat indicator; and
transmitting the descriptive information to the third-party system.

2. The computer-based method of claim 1, further comprising obfuscating the entity identifier by excluding raw information related to the entity.

3. The computer-based method of claim 1, further comprising reporting the cyber-threat to the third-party system when the obfuscated threat indicator matches at least one obfuscated entity identifier.

4. The computer-based method of claim 1, wherein generating the descriptive information comprises de-obfuscating the obfuscated threat indicator using a decryption key.

5. The computer-based method of claim 1, wherein the threat data source is not a client.

6. The computer-based method of claim 1, wherein the obfuscated threat indicator was generated using a hashing algorithm.

7. The computer-based method of claim 1, wherein the obfuscated threat indicator was generated using an encryption algorithm.

8. The computer-based method of claim 1, further comprising:
purging the obfuscated threat indicator when the obfuscated threat indicator expires, and
subsequently receiving a second obfuscated threat indicator associated with the identified cyber-threat, the second obfuscated threat indicator being different from the obfuscated threat indicator.

9. A computer program product for detecting threats based on obfuscated threat indicators, the computer program product comprising a non-transitory computer-readable storage medium containing computer program code for:
receiving, from a server, an obfuscated threat indicator associated with an identified cyber-threat that was determined by the server to be above a threshold level of quality, the obfuscated threat indicator having been generated by the server responsive to determining that the identified cyber-threat is above the threshold level of quality by: including a threat data source of a threat indicator and excluding raw information of the threat indicator;

identifying one or more client-side events occurring within a third-party system, each client-side event identified by an entity identifier indicating an entity to which the client-side event is attributed;

obfuscating the entity identifier by excluding raw information related to the entity;

determining that the third-party system experienced a cyber-threat when the obfuscated threat indicator matches at least one obfuscated entity identifier; and in response to determining that the third-party system experienced the cyber-threat:
generating descriptive information associated with the obfuscated threat indicator; and
transmitting the descriptive information to the third-party system.

10. The computer program product of claim 9, further comprising reporting the cyber-threat to the third-party system when the obfuscated threat indicator matches at least one obfuscated entity identifier.

11. The computer program product of claim 9, wherein generating the descriptive information comprises de-obfuscating the obfuscated threat indicator using a decryption key.

12. The computer program product of claim 9, wherein the threat data source is not a client.

13. The computer program product of claim 9, further comprising:
purging the obfuscated threat indicator when the obfuscated threat indicator expires, and
subsequently receiving a second obfuscated threat indicator associated with the identified cyber-threat, the second obfuscated threat indicator being different from the obfuscated threat indicator.

14. A computer-based method for transmitting threat information to client modules, the method comprising:
generating, at a server, obfuscated threat indicators associated with identified cyber-threats that are determined to be above a threshold level of quality, each respective obfuscated threat indicator having been generated responsive to determining that a respective cyber-threat is above the threshold level of quality by: including a threat data source of a threat indicator and excluding raw information of the threat indicator;
determining, by the server, that the obfuscated threat indicators are available for transmission to a client module;
determining, by the server, whether a threat detection report associated with the obfuscated threat indicators was received from the client module; and
transmitting, by the server, the obfuscated threat indicators to the client module in response to determining that the threat detection report was received from the client module.

15. The computer-based method of claim 14, further comprising process the threat detection report to evaluate a relevance between the obfuscated threat indicators and a client system associated with the client module.

16. The computer-based method of claim 14, wherein transmitting the obfuscated threat indicators comprises obfuscating the additional threat indicators prior to transmission and transmitting the obfuscated threat indicators to the client module.

* * * * *